United States Patent
Jeong et al.

(10) Patent No.: US 8,461,496 B2
(45) Date of Patent: Jun. 11, 2013

(54) INDUCTION HEATING DEVICE FOR BATTERY ELECTRODE

(75) Inventors: Dongho Jeong, Suwon-si (KR); Tatsuya Hashimoto, Suwon-si (KR); Wonhui Lee, Suwon-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 453 days.

(21) Appl. No.: 12/662,481

(22) Filed: Apr. 20, 2010

(65) Prior Publication Data

US 2010/0264133 A1    Oct. 21, 2010

(30) Foreign Application Priority Data

Apr. 21, 2009   (KR) .................. 10-2009-0034737

(51) Int. Cl.
*H05B 6/16* (2006.01)
(52) U.S. Cl.
USPC ........... 219/653; 219/619; 219/216; 219/637; 219/656; 219/662

(58) Field of Classification Search
USPC ......................................... 219/653
See application file for complete search history.

(56) References Cited

U.S. PATENT DOCUMENTS

| | | | |
|---|---|---|---|
| 2001/0012587 A1* | 8/2001 | Sakamoto et al. | 429/231.4 |
| 2002/0182488 A1* | 12/2002 | Cho et al. | 429/137 |
| 2006/0244166 A1* | 11/2006 | Wada et al. | 264/37.1 |

FOREIGN PATENT DOCUMENTS

| | | | |
|---|---|---|---|
| JP | 07-001023 A | | 1/1995 |
| JP | 2004-335374 A | | 11/2004 |
| JP | 2004335374 A | * | 11/2004 |
| JP | 2007-273390 A | | 10/2007 |

* cited by examiner

*Primary Examiner* — Ajay K Arora
(74) *Attorney, Agent, or Firm* — Lee & Morse, P.C.

(57) ABSTRACT

An induction heating device includes a take-off roller, the take-off roller adapted to unwind a wound electrode plate having a coating portion and a non-coating portion, a guide roller adapted to feed the electrode plate, an induction heater above the guide roller, the induction heater being spaced a predetermined distance from the guide roller and the electrode plate, and a winding roller, the winding roller adapted to wind the electrode plate fed from the guide roller.

20 Claims, 2 Drawing Sheets

INDUCTION HEATING DEVICE FOR BATTERY ELECTRODE

BACKGROUND

1. Field

Example embodiments relate to an induction heating device.

2. Description of the Related Art

A motor vehicle may generally have a power source, e.g., an engine, to produce a driving force from gasoline or diesel. In recent years, environmental pollution, which has emerged as a global problem, has brought a spotlight to a hybrid vehicle, i.e., a vehicle employing both an engine, e.g., a mechanical motor, and an electric motor, to reduce fuel consumption and to increase overall energy efficiency.

Interconversion between chemical energy and electrical energy of a lithium ion battery in the hybrid vehicle may be reciprocal. The lithium ion battery in the hybrid vehicle may be a rechargeable battery, i.e., repetitively charging/discharging, and may include an electrode assembly having positive and negative electrodes with a separator therebetween. The lithium ion battery may further include a case for accommodating the electrode assembly, and a cap plate coupled with the case to seal the case. Each of the positive and negative electrodes in the electrode assembly may include an electrode plate having a coating portion, i.e., a portion coated with an electrode material, and a non-coating portion.

SUMMARY

Embodiments are directed to an induction heating device, which substantially overcomes one or more of the problems due to the limitations and disadvantages of the related art.

It is therefore a feature of an embodiment to provide an induction heating device having a structure providing selective induction heating of an electrode plate.

At least one of the above and other features and advantages may be realized by providing an induction heating device, including a take-off roller, the take-off roller adapted to unwind a wound electrode plate having a coating portion and a non-coating portion, a guide roller adapted to feed the electrode plate, an induction heater above the guide roller, the induction heater being spaced a predetermined distance from the guide roller and the electrode plate, and a winding roller, the winding roller adapted to wind the electrode plate fed from the guide roller.

The induction heater may include a high-frequency generator, and a work coil to generate induced electromotive force. The work coil may be positioned to overlap only the non-coating portion of the electrode plate. The work coil may overlap the guide roller.

Further, the induction heater may be installed in a pressing machine for pressing the electrode plate to perform pressing and induction heating of the electrode plate, simultaneously.

The work coil may have a same width as that of a non-coating portion to be annealed. The work coil may extend from the high-frequency generator toward the electrode plate, the work coil overlapping the non-coating portion of the electrode plate.

The guide roller may include a non-thermally conductive material. The guide roller may include polytetrafluoroethylene. The guide roller may be installed in the lower side of the electrode plate and the induction heater is installed in the upper side of the electrode plate. The induction heater overlaps the guide roller.

The induction heating device may further include a feed roller adapted to facilitate feeding of the electrode plate fed from the guide roller. The guide roller and the feed roller may form an angle between a common external tangent and a common internal tangent of the guide roller and the feed roller from about −20 degrees to about 0 (zero) degrees. The guide roller and the feed roller may be arranged to have their common external tangent substantially parallel to a surface supporting the induction heating device.

The induction heating device may further include a suction unit installed between the take-off roller and the induction heater to suction organic materials generated from the electrode plate.

The induction heating device may further include a cooler installed between the induction heater and the winding roller to cool the electrode plate.

The induction heating device may further include dummy rollers. The dummy rollers may be installed between the take-off roller and the guide roller and between the guide roller and the winding roller to provide tension to the electrode plate.

The dummy rollers may be installed in the lower side of the guide roller between the guide roller and the take-off roller.

The induction heating device may further include a rear dummy roller installed in the lower side of the guide roller between the guide roller and the winding roller.

The induction heater may include a first induction heater above a first edge of the guide roller and a second induction heater above a second edge of the guide roller, the first and second edges of the guide roller being opposite each other, and the first and second induction heaters being spaced apart from each other. The first and second induction heaters may be positioned to have the space therebetween completely overlap the coating portion of the electrode plate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1A:
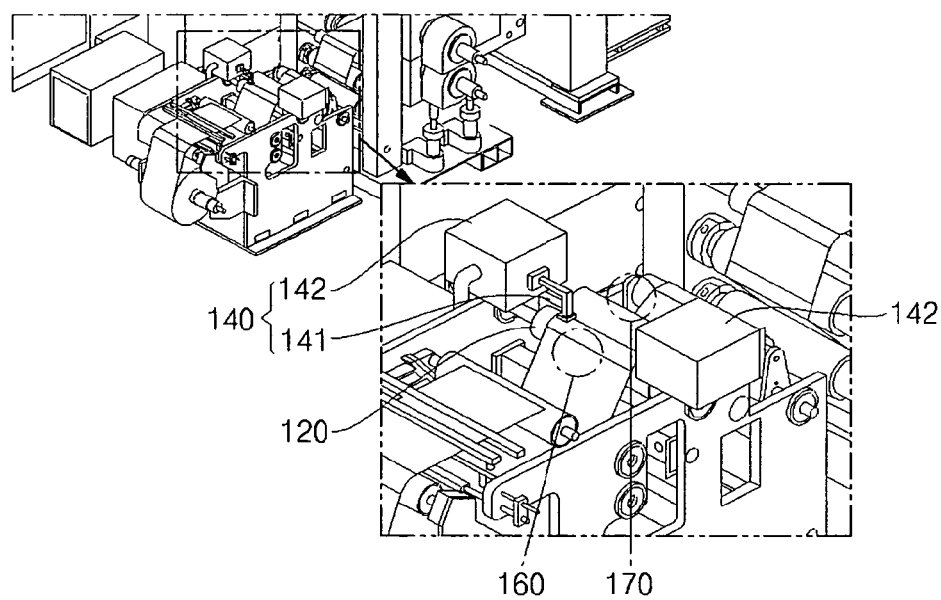
FIG. 1A illustrates a perspective view of an induction heating device according to an embodiment.

Korean Patent Application No. 10-2009-0034737 filed on Apr. 21, 2009, in the Korean Intellectual Property Office, and entitled: "Induction Heating Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments will be described in detail with reference to the accompanying drawings.

Figure 1B:
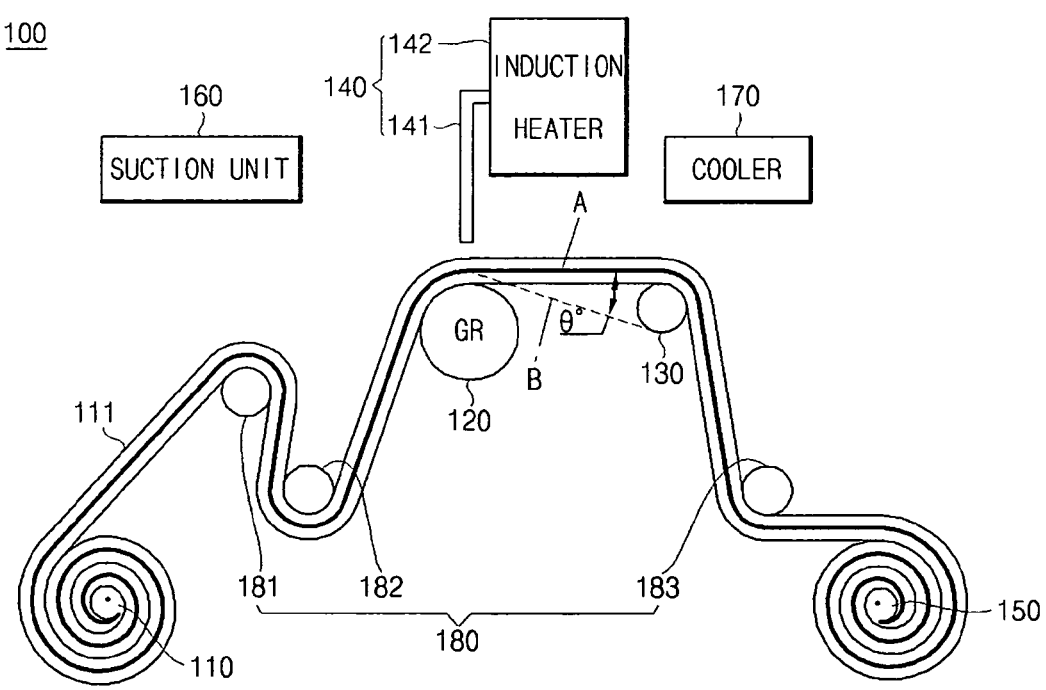
FIG. 1B illustrates a schematic a cross-sectional view of an induction heating device according to an embodiment.
Figure 1C:
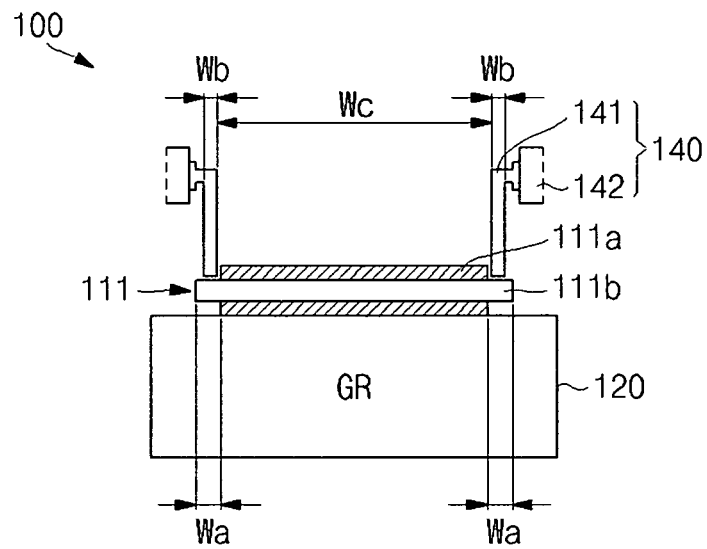
FIG. 1C illustrates a cross-sectional view of an electrode plate in the induction heating device according to an embodiment.
Figure 1D:
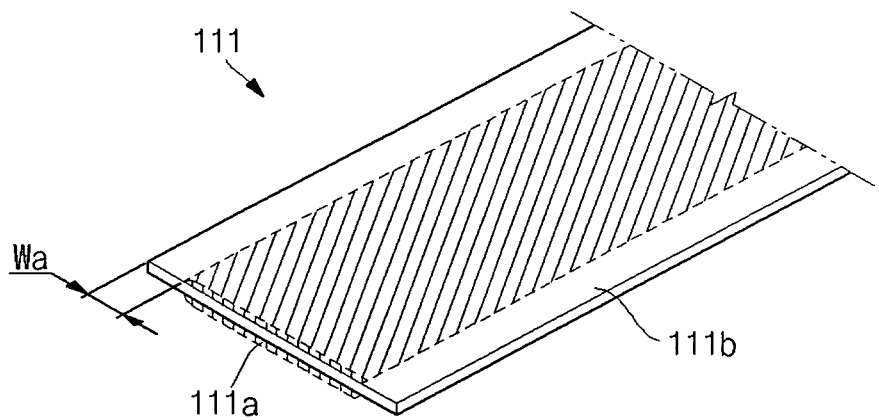
FIG. 1D illustrates a perspective view of an electrode plate fed to the induction heating device according to an embodiment.

FIG. 1A illustrates a perspective view of an induction heating device according to an embodiment. FIGS. 1B and 1C illustrate side and front cross-sectional views of the induction heating device in FIG. 1, respectively. The cross-section illustrated in FIG. 1B is in a plane perpendicular to a plane of the cross-section illustrated in FIG. 1C. FIG. 1D illustrates a perspective view of the electrode plate fed to the induction heating device.

As illustrated in FIGS. 1A and 1B, an induction heating device 100 according to an embodiment may include a take-off roller 110, a guide roller 120, a feed roller 130, an induction heater 140, and a winding roller 150. The induction heating device 100 may further include a suction unit 160, a cooler 170, and dummy rollers 180.

The induction heating device 100 may heat an electrode plate 111 by induction heating. As illustrated in FIGS. 1C and 1D, the electrode plate 111 may include a coating portion 111a and a non-coating portion 111b. For example, the electrode plate 111 may have a strap shape, and may include the coating portion 111a in a center thereof. The coating portion 111a may be coated with an active material, and the non-coating portion 111b may include no active material. For example, as further illustrated in FIG. 1D, the non-coating portions 111b may be formed on both sides, e.g., along peripheral edges, of the electrode plate 111 in the longitudinal direction, i.e., the coating portion 111a may be positioned between two non-coating portions 111b. However, other configurations are included in the inventive concept, e.g., only one non-coating portion 111b may be formed in the electrode plate 111.

The active material to be coated on the coating portion 111a may be, e.g., one or more of Lithium-Cobalt-Dioxide, Lithium-Manganese-Dioxide, and Lithium-Nickel-Dioxide. The active material may be on a central area of the electrode plate 111 to define the coating portion 111a, i.e., excepting the non-coating portion 111b on the one or both longitudinal sides along a first direction of the electrode plate 111. The electrode plate 111 with the active material thereon may define an electrode, e.g., a positive electrode of an electrode assembly for a battery.

Referring to FIGS. 1A and 1B, the take-off roller 110 may have a cylindrical shape to take off the electrode plate 111, e.g., the electrode plate 111 may be unwound from the take-off roller 110. A length of the take-off roller 110 along a second direction may be longer than a width of the electrode plate 111 along the second direction, e.g., the second direction may be substantially perpendicular to the first direction. The take-off roller 110 may be in contact with the electrode plate 111, and may be coupled to a rotation shaft of the induction heating device 100. Although not depicted, the rotation shaft may be perpendicular to an unwinding direction of the electrode plate 111. Thus, the take-off roller 110 may rotate in the unwinding direction of the electrode plate 111. Although not illustrated in the drawings, the take-off roller 110 may be coupled to a motor to provide a driving force to take off the electrode plate 111, i.e., the electrode plate 111 may be unwound from the take-off roller 110 to be moved toward the guide roller 120 and the induction heater 140.

As illustrated in FIGS. 1A and 1B, the guide roller 120 may have a cylindrical shape to feed the electrode plate 111. A length of the guide roller 120 may be longer than the width of the electrode plate 111 in the second direction for easy feeding of the electrode plate 111. The guide roller 120 may be made of a non-thermally conductive and non-electrically conductive material. For example, the non-thermally and non-electrically conductive material may exhibit heat-resistance and/or abrasion resistance, e.g., the non-thermally and non-electrically conductive material may be polytetrafluoroethylene (PTFE). For example, the PTFE, i.e., Teflon®, is a heat resistant polymeric material that may also exhibit strong friction and noise resistance. Further, Teflon may not be easily burned or melted at high temperatures during heating of the electrode plate 111. In addition, Teflon may have a substantially smooth surface, so contaminants may not readily adhere thereto. The guide roller 120 may be parallel to an axial direction of the take-off roller 110, i.e., longitudinal sides of the guide roller 120 and take-off roller 110 may extend along the second direction. As illustrated in FIG. 1B, the electrode plate 111 may extend from the take-off roller 110 toward the guide roller 120, so the electrode plate 111 may be placed on an upper side of the guide roller 120, i.e., a side of the guide roller 120 facing the induction heater 140. Therefore, the electrode plate 111 may be in contact with the surface of the guide roller 120.

The feed roller 130 may have a cylindrical shape to feed the electrode plate 111. The feed roller 130 may be parallel to the axial direction of the guide roller 120, and the electrode plate 111 may be placed on the upper side of the feed roller 130, i.e., a side facing the induction heater 140. As illustrated in FIG. 1B, sizes and relative orientation of the feed roller 130 and the guide roller 120 may be adjusted to define an angle θ between a common external tangent A of the rollers 120 and 130 and a common internal tangent B thereof. The angle θ may be from about (−20) degrees to about 0 degrees with respect to a line tangent to the upper side of the guide roller 120 and substantially parallel to a floor supporting the induction heating device 100, e.g., the angle θ may be adjusted according to a position of the guide roller 120.

This is because the guide roller 120 and the feed roller 130 may not properly support the inductively heated electrode plate 111 when the angle θ between the common tangents A and B of the rollers 120 and 130 exceeds 0 (zero). For example, if the feed roller 130 is positioned higher than the guide roller 120 relative to the floor supporting the induction heating device 100, the angle θ will exceed 0 degrees and the electrode plate 111 may not be properly supported by the rollers. When the angle θ is larger than about (−20) degrees, e.g., when the feed roller 130 is positioned very low relative to the guide roller 120, a surface contact between the electrode plate 111 and the guide roller 120 may increase, so a heat transfer rate from the inductively heated electrode plate 111 to the guide roller may 120 may increase. For example, the guide roller 120 and the feed roller 130 may be parallel to each other, e.g., the common external tangent A may be substantially parallel to the floor supporting the induction heating device 100, so that the heat transfer from the electrode plate 111 to the guide roller 120, occurring when the electrode plate 111 contacts the guide roller 120 during the induction heating, may be minimized. Therefore, arrangement of the feed roller 130 and the guide roller 120 may provide an easy feed of the electrode plate 111 from the guide roller 120, and may minimize the heat transfer from the electrode plate 111 to the guide roller 120.

As illustrated in FIGS. 1A-1C, the induction heater 140 may be positioned above the guide roller 120, so the electrode plate 111 may be between the induction heater 140 and the guide roller 120. As further illustrated in FIGS. 1A-1C, the induction heater 140 may include a main body 142, e.g., a high-frequency generator, and a work coil 141 extending from the main body 142 toward the electrode plate 111. The work coil 141 may be close to the non-coating portion 111b of the electrode plate 111, and may perform the induction heating of the non-coating portion 111b. As illustrated in FIG. 1C, the work coil 141 may have a width $w_b$, i.e., measured along the second direction, corresponding to a width $w_a$ of the non-coating portion 111b, i.e., measured along the second direction. For example, the width $w_a$ of the non-coating portion 111b may be equal to or larger than the width $w_b$ of the work coil 141, as illustrated in FIG. 1C, so the non-coating portion 111b may completely overlap the work coil 141. A terminal end of the work coil 141, i.e., an end facing the non-coating portion 111b, may be spaced apart from the non-coating portion 111b, and may be oriented to overlap a portion of the guide roller 120. The work coil 141 may be made of a highly thermally conductive material.

For example, the induction heater 140 may be placed on one side of a feeding path of the electrode plate 111, i.e., above one edge of the guide roller 120, to heat the non-coating portion 111b formed on one side of the electrode plate 111. In another example, a plurality of induction heaters 140 facing each other may be respectively placed at a distance from each other, e.g., at opposing sides of the electrode plate 111 and above opposing edges of the guide roller 120, to heat the non-coating portions 111b formed on both sides of the electrode plate 111, as illustrated in FIGS. 1A and 1C. The induction heater 140 may be mounted in a pressing machine for pressing the electrode plate 111 to perform pressing and annealing of the electrode plate 111 simultaneously, e.g., when attaching any elements to the electrode plate 111 during manufacturing of a battery.

The electrode plate 111 may be fed to a lower side of the induction heater 140, i.e., a side facing the guide roller 120. In a case of mounting the plurality of induction heaters 140, a distance between the induction heaters 140, i.e., measured between facing work coils 141, may correspond to a distance $w_c$ between non-coating portions 111b along the second direction, as illustrated in FIG. 1C. The induction heaters 140 may heat, e.g., selectively, the non-coating portions 111b of the electrode plate 111 taken off from the take-off roller 110, e.g., only the non-coating portions 111b of the electrode plate 111. By doing so, only the non-coating portions 111b of the electrode 111 may be locally heated by the induction heating, e.g., the coating portion 111a of the electrode plate 111 may not be heated, so that bending of the electrode plate 111, e.g., due to overheating, may be prevented or substantially minimized.

The winding roller 150 may have a cylindrical shape to wind the electrode plate 111. The winding roller 150 may contact the electrode plate 111, and may be wider than the electrode plate 111. The winding roller 150 may be coupled to a rotation shaft of the induction heating device 100. Although not shown in the drawings, the rotation shaft may be substantially vertical with respect to a winding direction of the electrode plate 111. Thus, the winding roller 150 may rotate in the winding direction of the electrode plate 111. Although not shown in the drawings, the winding roller 150 may be coupled to a motor to provide a driving force to feed the electrode plate 111, so that the winding roller 150 may wind the electrode plate 111 inductively heated by the induction heater 140.

The suction unit 160 may be any suitable suction unit. For example, the suction unit 160 may include a duct and a fan to remove unwanted materials, e.g., organic residue, impurities, etc., from the electrode plate 111. For example, the suction unit 160 may be installed between the take-off roller 110 and the induction heater 140, e.g., above a terminal end of the work coil 141, to remove organic materials from the electrode plate 111. In other words, the suction unit 160 may remove remaining organic materials from the electrode plate 111 before the electrode plate 111 is fed in the induction heater 140. Therefore, a uniform temperature distribution in any region of the non-coating portion 111b may be achieved during the induction heating.

The cooler 170 may be any suitable air blower to blow external air with a pump or a fan to cool the upper side of the electrode plate 111. For example, the cooler 170 may be installed between the induction heater 140 and the winding roller 150 to cool the electrode plate 111. For example, as shown in FIG. 1B, the cooler 170 may be installed in an upper one side of the induction heating device 100 to blow air onto one side, e.g., upper side, of the electrode plate 111. In another example, the cooler 170, e.g., an additional cooler 170, may be installed to face the lower side of the electrode plate 111 to cool an opposite side of the electrode plate 111, resulting in increasing cooling efficiency of the electrode plate 111.

Furthermore, the cooler 170 may be installed as close to the induction heater 140 as possible to increase cooling rate of the electrode plate 111 and to minimize heat transfer to the guide roller 120. During the feeding of the heated electrode plate 111, the heated electrode plate 111 may be cooled by adjusting a distance between the cooler 170 and the winding roller 150. In other words, the cooler 170 may reduce the temperature of the electrode plate 111 and may remove any remaining unwanted materials, e.g., volatile materials, from the electrode plate 111.

The dummy rollers 180 may have a cylindrical shape for easy feeding of the electrode plate 111. For example, as illustrated in FIG. 1B, the dummy rollers 180 may include front dummy rollers 181 and 182 in the lower side of the guide roller 120, i.e., a lower height level than the guide roller 120, between the guide roller 120 and the take-off roller 110. As further illustrated in FIG. 1B, the dummy rollers 180 may include a rear dummy roller 183 in the lower side of the feed roller 130, i.e., a lower height level than the feed roller 130, between the feed roller 130 and the winding roller 150. The front dummy rollers 181 and 182 may include a first front dummy roller 181 installed, e.g., on a lower side of the electrode plate 111, between the take-off roller 110 and the suction unit 160, and a second front dummy roller 182 installed, e.g., on the upper side of the electrode plate 111, between the first front dummy roller 181 and the guide roller 120. The rear dummy roller 183 may be installed on, e.g., directly on, the upper side of the electrode plate 111 between the feed roller 130 and the winding roller 150.

The dummy rollers 180 may be installed to provide tension to the electrode plate 111 between the take-off roller 110 and the guide roller 120, and between the guide roller 120 and the winding roller 150. Since the dummy rollers 180 provide tension to the electrode plate 111 and feed the electrode plate 111 without winding the same, cracking or folding of the electrode plate 111 may not be generated.

Hereinafter, operation of the induction heating device 100 will be described in detail.

In the induction heating device 100, an electrode plate 111 having the coating portion 111a and the non-coating portion 111b and wound on the take-off roller 110 may be provided. The take-off roller 110 may be positioned in the inner lower side of the induction heating device 100. First, the electrode plate 111 may be taken-off, i.e., unwound, from the take-off roller 110.

The taken-off electrode plate 111 may be fed from the take-off roller 110 through the first dummy roller 181 toward the suction unit 160. The taken-off electrode plate 111 may be tightened by the tension provided by the first front dummy roller 181 spaced away from the take-off roller 110, and may be fed to the suction unit 160. At this time, the suction unit 160 may remove organic materials from the electrode plate 111. After that, the organic material free electrode plate 111 may be fed to the induction heater 140 while being tightened by the tension provided by the second front dummy roller 182 and the guide roller 120. The dummy rollers 180 may feed the electrode plate 111 without winding, so that cracking or folding of the electrode plate 111 may not be generated. When the electrode plate 111 is fed to the induction heater 140, the induction heater 140 may perform the induction heating of the non-coating portion 111b of the fed electrode plate 111 using the work coil 141.

After that, the heated electrode plate 111 may be fed to the cooler 170 for reducing the temperature thereof and removing any remaining volatile materials from the electrode plate 111. For example, the cooler 170 may blow air on the upper side of the electrode plate 111, e.g., using the blower to reduce the temperature of the electrode plate 111.

As such, the electrode plate 111 passed through the suction unit 160, the induction heater 140, and the cooler 170 may be fed to the winding roller 150 to be wound around the winding roller 150.

According to example embodiments, an induction heater 140 may provide induction heating to the electrode plate 111 without causing bending. In particular, the electrode plate 111 may be processed selectively via a heat induction process, i.e., locally only in the non-coating portion 111b of the electrode plate 111, by the work coil 141 of the induction heater 140, so only selected portions of the electrode plate 111 may be uniformly heated, e.g., without overheating the entire electrode plate 111.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An induction heating device, comprising:
   a take-off roller, the take-off roller adapted to unwind a wound electrode plate having a coating portion and a non-coating portion;
   a guide roller adapted to feed the electrode plate, the guide roller facing a first surface of the electrode plate;
   an induction heater above the guide roller, the induction heater being positioned to face only a second surface of the electrode plate and to be spaced a predetermined distance from the guide roller and the electrode plate, the first and second surfaces of the electrode plate being opposite each other; and
   a winding roller, the winding roller adapted to wind the electrode plate fed from the guide roller.

2. The induction heating device as claimed in claim 1, wherein the induction heater includes:
   a main body; and
   a work coil connected to the main body to generate induced electromotive force, the work coil facing only the second surface of the electrode plate.

3. The induction heating device as claimed in claim 2, wherein a width of the work coil is equal to or smaller than a width of the non-coating portion of the electrode plate.

4. The induction heating device as claimed in claim 2, wherein the work coil is positioned to overlap only the non-coating portion of the electrode plate.

5. The induction heating device as claimed in claim 2, wherein the work coil overlaps the guide roller.

6. The induction heating device as claimed in claim 1, wherein the induction heater is installed in a pressing machine for pressing the electrode plate to perform pressing and induction heating of the electrode plate, simultaneously.

7. The induction heating device as claimed in claim 1, wherein the guide roller includes a non-thermally conductive material.

8. The induction heating device as claimed in claim 7, wherein the guide roller includes polytetrafluoroethylene.

9. The induction heating device as claimed in claim 1, wherein the guide roller and the induction heater are arranged to have the electrode plate therebetween.

10. The induction heating device as claimed in claim 1, further comprising a feed roller adapted to facilitate feeding of the electrode plate fed from the guide roller.

11. The induction heating device as claimed in claim 10, wherein the guide roller and the feed roller are positioned to define a predetermined angle between a common external tangent and a common internal tangent of the guide roller and the feed roller, the predetermined angle being from about (−20) degrees to about 0 (zero) degrees with respect to a line tangent to an upper side of the guide roller and parallel to a surface supporting the induction heating device.

12. The induction heating device as claimed in claim 11, wherein the guide roller and the feed roller are arranged to have their common external tangent substantially parallel to a surface supporting the induction heating device.

13. The induction heating device as claimed in claim 1, further comprising a suction unit between the take-off roller and the induction heater to remove organic materials from the electrode plate.

14. The induction heating device as claimed in claim 1, further comprising a cooler between the induction heater and the winding roller to cool the electrode plate.

15. The induction heating device as claimed in claim 1, further comprising dummy rollers between the take-off roller and the guide roller and between the guide roller and the winding roller to provide tension to the electrode plate.

16. The induction heating device as claimed in claim 15, wherein the dummy rollers include:
   front dummy rollers between the guide roller and the take-off roller, the front dummy rollers being at a lower height than the guide roller with respect to a surface supporting the induction heating device; and
   a rear dummy roller between the guide roller and the winding roller, the rear dummy roller rollers being at a lower height than the guide roller with respect to a surface supporting the induction heating device.

17. The induction heating device as claimed in claim 1, wherein the induction heater includes a first induction heater above a first edge of the guide roller and a second induction heater above a second edge of the guide roller, the first and second edges of the guide roller being opposite each other, and the first and second induction heaters being spaced apart from each other.

18. The induction heating device as claimed in claim 17, wherein the first and second induction heaters are positioned to have the space therebetween completely overlap the coating portion of the electrode plate.

19. The induction heating device as claimed in claim 1, wherein the guide roller is wider than the electrode plate along a direction perpendicular to the unwinding direction of the electrode plate, the guide roller overlapping an entire width of the electrode plate.

20. The induction heating device as claimed in claim 1, wherein the guide roller is directly below the induction heater, the guide roller being configured to support the electrode plate during operation of the induction heater.

\* \* \* \* \*